Patented Mar. 9, 1943

2,313,678

UNITED STATES PATENT OFFICE 2,313,678

RESIN

John Kenson Simons, Toledo, Ohio, assignor to Plaskon Company, Incorporated, Toledo, Ohio, a corporation of Delaware No Drawing. Application January 29, 1942, Serial No. 428,757

2 Claims. (Cl. 260—29)

This application is a continuation-in-part of Ser. No. 275,873, filed May 26, 1939.

Infusible formaldehyde-urea resins are valuable for use in lacquer coatings, because of their insolubility in all solvents, and their resistance to weathering. However, these resins are organic substances, and are less resistant in some particulars than a mineral coating such as porcelain enamel.

The principal object of the invention is the preparation of novel resins and lacquer coatings containing a silicon compound that remains permanently in the resinous phase in the finished product. More specific objects and advantages are apparent from the description, which merely discloses and illustrates the invention and is not intended to impose limitations upon the claims.

The presence of the silicon compound in lacquer coatings embodying the invention tends to impart the advantageous properties of mineral coatings, such as water resistance, hardness, and adhesion to glass and ceramic surfaces. Also, the silicon compound in the lacquer solutions of the present invention facilitates the introduction into the lacquers of hydroxy compounds, which may serve as plasticizers.

When urea and formaldehyde react, the initial products are monomethylol urea,

and dimethylol urea,

When further condensation is carried out, the monomethylol urea or dimethylol urea condenses with the elimination of water. The liberation of each molecule of water entails the elimination of one hydroxy group. Although the number of hydroxy groups in the condensation product is less than the total number of hydroxy groups in the methylol urea molecules from which the condensation product was formed, such a condensation product contains terminal or residual hydroxy groups.

When an alcohol reacts with a methylol urea or a formaldehyde-urea condensation product, water is eliminated, and hydroxy groups in the formaldehyde-urea product are converted to alkoxy groups. If the reaction of a methylol urea or a formaldehyde-urea condensation product with an excess of an alcohol is carried substantially to completion, the resulting product contains substantially no hydroxy groups. The reaction of 2 molecules of an alcohol having the formula ROH with 1 molecule of dimethylol urea produces a product whose formula is known to be R—O—CH$_2$—NH—CO—NH—CH$_2$—O—R. The latter substance is called a di-ether or di-hemiacetal of dimethylol urea, and contains no hydroxy groups. The term "alkylated reaction product of formaldehyde and urea" is used herein to denote the reaction product of an aliphatic alcohol, such as capryl alcohol, n-hexanol, glycol monomethyl ether, n-pentanol or a lower alcohol, with a reaction product consisting solely of formaldehyde residues and urea residues. An alkylated reaction product of formaldehyde and urea consists solely of alcohol residues, formaldehyde residues and urea residues.

The type of product used in formaldehyde-urea lacquers is an alkylated reaction product of formaldehyde and urea substantially free from hydroxy groups, i. e., a formaldehyde-urea reaction product that has reacted substantially completely with an alcohol so that substantially all its hydroxy groups have been replaced by alkoxy groups. An alkylated reaction product of formaldehyde and urea must be substantially free from hydroxy groups in order to be highly soluble in the hydrocarbons that are commonly used as thinners for lacquers.

A solution embodying the invention is prepared by bringing together in organic solution an ethyl silicate, water, and an alkylated reaction product of formaldehyde and urea substantially free from hydroxy groups. The preferred ethyl silicate is ethyl orthosilicate, and the preferred organic solvent is an alcoholic solvent. However, any other organic solvent such as an excess of ethyl orthosilicate may be employed. By "alcoholic solvent" or "alcoholic solutions" is meant an alcohol or an organic liquid containing an alcohol in solution.

The reaction may be considered complete as soon as all of the ingredients are in solution. Ordinarily, if an undissolved excess of one ingredient is present, only the dissolved portion of the ingredient becomes a part of the resin, and the undissolved portion may be removed by filtration or decantation.

It is known that ethyl orthosilicate undergoes alcoholysis to form gels. However, such gels are of no value as lacquer ingredients. When an attempt is made to harden them by drying, they are converted into granular or flaky solids. In contrast, when ethyl silicate, water and an alkylated reaction product of formaldehyde and urea are brought together in organic solution in accordance with the invention, a lacquer of high quality is produced. After the lacquer has been applied to form a coating, the silicon compound remains permanently in the resinous phase. This compound is so much a part of the resinous phase that the appearance of the coating containing the silicon compound is exactly the same as a coating containing the formaldehyde-urea resin alone. If no pigment is used in the lacquer, the finished coating containing the silicon compound is perfectly transparent.

Water is an essential ingredient in the preparation of the present lacquer solutions. It is believed that the water reacts with the ethyl silicate, causing ethanol to be split off. Thus the solute in the lacquer solutions and the resin in the lacquer coatings may be a reaction product of ethyl silicate, water, formaldehyde and urea. The water in the reaction solution may be obtained from any desired source.

The alkoxy groups in the alkylated formaldehyde-urea reaction product may be derived from an alcohol such as capryl alcohol, n-hexanol, glycol monomethyl ether, n-pentanol or a lower alcohol.

Organic lacquer solutions of formaldehyde-urea reaction products may be used in carrying out the invention, by simply adding an ethyl silicate and water thereto. The addition of water is necessary, because the solutions that are commercially available contain substantially no water, and the formaldehyde-urea reaction products in such solutions are alkylated formaldehyde-urea reaction products which contain substantially no hydroxy groups. If an ethyl silicate alone is added to such solutions, it volatilizes when the solutions are applied to form lacquer coatings, or remains incompatible to produce opaque coatings.

The proportions of the three ingredients, i. e., the ethyl silicate, the water and the alkylated formaldehyde-urea reaction product may vary within wide limits. If it is desired that the silicon content of the finished product be low it may be made as small as desired, either by using a minute amount of ethyl silicate, or by using a minute amount of water. The ratio of the amount of water used to the amount of ethyl silicate employed may be varied widely. If an excess of either is used, it simply remains unreacted, and, for all practical purposes, a part of the solvent.

After an organic solution embodying the invention has been prepared, it may be treated or modified in any desired manner, and various ingredients may be added. For example, it may be desirable to subject the solution to a distillation process for the purpose of removing all free water. A solution that is to be used in a lacquer should contain as little free water as possible, because the water makes it difficult to incorporate thinners such as toluene and petroleum naphtha. A solution embodying the invention may also be heated with or without a catalyst, to induce partial polymerization of the formaldehyde-urea reaction product. Such treatment makes the lacquer coating harden faster after being applied. When an organic solution containing a formaldehyde-urea reaction product is to be used as lacquer, adhesive or binder, it is always desirable that the solution contain an acid, to serve as a hardening catalyst. The acid catalyst causes the formaldehyde-urea reaction product to harden into a resin after the solution has been applied. The hardening may take place at ordinary temperatures, but is greatly accelerated by baking. When such a solution contains an acid, it is desirable that the solution contain as little free water as possible, in order that it may be stable.

An organic solution embodying the invention is useful not only as a lacquer, but also as a binder or adhesive. It is more useful for some purposes than an aqueous adhesive solution. For example, the organic solution of the present invention penetrates certain fabrics such as wool better than an aqueous solution. Impregnation of a fabric with the present solution, followed by hardening of the resin, imparts stiffness and water resistance to the fabric. The present solution is also useful as an adhesive for laminated glass.

A solution embodying the invention may also be cast to form transparent articles. Evaporation of the solvent may be completed after the article has been cast. If desired, the hardening of the cast article may be accelerated by baking at a moderate temperature.

In the following examples, other ethyl silicates, such as ethyl metasilicate and ethyl disilicate may be substituted for ethyl orthosilicate.

*Example 1*

A modified reaction product of formaldehyde and urea is first prepared as follows: Concentrated sulfuric acid (1 part) and then dimethylol urea (100 parts) are added to 300 parts of methyl alcohol. The dimethylol urea is dissolved at a temperature below 50° C., and the resulting solution is neutralized with a saturated alcoholic solution of potassium hydroxide, filtered and then allowed to evaporate at 80° C. to one-half its original volume. After the concentrated solution is cooled, crystals of the modified formaldehyde-urea reaction product separate out, and are filtered off and dried at 55° to 60° C.

In the foregoing treatment, the methyl alcohol reacts with the dimethylol urea, and this reaction consists in the substitution of a methoxy group for each of the two hydroxy groups in the dimethylol urea. The resulting crystalline substance is a known chemical compound, which is called "dimethylol urea dimethyl ether," or "dimethylol urea di-(methyl hemiacetal)." It will be noted that this chemical compound is an alkylated reaction product of formaldehyde and urea, which contains no hydroxy groups.

Twenty-five parts of this crystalline material, 50 parts of n-butanol, 25 parts of ethyl orthosilicate, ¼ part of maleic acid and .5 to 7.5 parts of water are then warmed to a temperature of 40°–50° C. to cause complete solution. The resulting lacquer solution gives a transparent, colorless lacquer coating when applied and baked. This coating is extremely hard and smooth. It is unaffected by ultraviolet light, resistant to water, and insoluble in all solvents, and it does not craze or otherwise deteriorate by weathering.

Lacquer films obtained by baking weighed samples of solutions prepared in accordance with the present example on glass plates for 1½ hours at 107° C. were weighed and then ignited to a white residue that was weighed as silica. Tabulated below are the number of parts of water used in preparing each of six solutions, the per cent of weight lost by the sample of each solution during baking and hardening of the lacquer film, and the per cent of silica contained in each lacquer (weighed as dry $SiO_2$).

| Parts of water used | Weight loss | $SiO_2$ |
|---|---|---|
| | Percent | Percent |
| 0.5 | 73 | 1.6 |
| 1.0 | 70 | 2.4 |
| 2.0 | 68 | 4.6 |
| 2.5 | 65 | 5.6 |
| 5.0 | 68 | 6.9 |
| 7.5 | 70 | 6.9 |

Curves plotted from the above data show that the use of slightly more than 3 parts of water caused practically all the silicon from the ethyl orthosilicate to remain in the final lacquer film.

Use of additional water did not produce any higher silicon content in the lacquer. The use of this amount of water, which provided 1½ mols of water for each mol of ethyl orthosilicate, also caused the least amount of volatilization during drying and baking of the lacquer coating. It is believed that an excess of water above this amount caused slight decomposition and volatilization of the formaldehyde-urea reaction product. If the water is omitted in the foregoing procedure, practically no silicon remains in the dried lacquer film. In the foregoing procedure, various organic solvents such as glycol monomethyl ether, n-pentanol or a lower alcohol may be substituted for the n-butanol.

Example 2

Any of the foregoing lacquer solutions may be acidified with 5 per cent of its weight of iso dibrom succinic acid, and poured into a bottle. A specimen to be preserved may then be placed in the bottle, after which the bottle is sealed in order to arrest all evaporation of the solvent. The liquid becomes transformed into a glasslike solid, which preserves and supports the specimen. If the bottle were not sealed, the solid would shrink because of evaporation of the solvent.

Various embodiments of the invention may be devised to meet various requirements.

Having described my invention, I claim:

1. A method of preparing a solution suitable for use as a lacquer that comprises bringing an ethyl silicate, water, and an alkylated reaction product of formaldehyde and urea substantially free from hydroxy groups together in organic solution in a solvent capable of forming a solution with said ingredients.

2. A method of preparing a solution suitable for use as a lacquer that comprises bringing together water, ethyl orthosilicate and an alkylated reaction product of formaldehyde and urea substantially free from hydroxy groups in an acid alcoholic solvent that is capable of forming a solution with said ingredients.

JOHN KENSON SIMONS.